(12) United States Patent
Miyata

(10) Patent No.: US 10,908,459 B2
(45) Date of Patent: Feb. 2, 2021

(54) LIGHTING DEVICE AND DISPLAY DEVICE

(71) Applicant: SHARP KABUSHIKI KAISHA, Sakai (JP)

(72) Inventor: Tsuyoshi Miyata, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/666,209

(22) Filed: Oct. 28, 2019

(65) Prior Publication Data
US 2020/0142261 A1 May 7, 2020

Related U.S. Application Data

(60) Provisional application No. 62/757,073, filed on Nov. 7, 2018.

(51) Int. Cl.
*F21V 8/00* (2006.01)
*G02F 1/1335* (2006.01)
*G02F 1/13357* (2006.01)

(52) U.S. Cl.
CPC ....... *G02F 1/133608* (2013.01); *G02B 6/005* (2013.01); *G02F 1/133524* (2013.01); *G02F 2001/133612* (2013.01)

(58) Field of Classification Search
CPC ... G02F 2001/133612; G02F 1/133524; G02F 1/133608; G02B 6/005
See application file for complete search history.

(56) References Cited

U.S. PATENT DOCUMENTS

| | | | |
|---|---|---|---|
| 8,228,462 B2* | 7/2012 | Sasaki | G02B 5/02 349/58 |
| 8,830,419 B2* | 9/2014 | Wang | G02B 6/0088 349/58 |
| 9,488,770 B2* | 11/2016 | Horiguchi | G02F 1/133308 |
| 10,215,912 B2* | 2/2019 | Teramoto | G02B 6/0093 |
| 10,281,645 B2* | 5/2019 | Kong | G02B 6/0056 |
| 2015/0277185 A1* | 10/2015 | Nam | G02B 6/122 349/58 |
| 2017/0227806 A1* | 8/2017 | Yamamoto | G02B 6/0088 |

FOREIGN PATENT DOCUMENTS

JP 2011-186179 A 9/2011

* cited by examiner

*Primary Examiner* — Arman B Fallahkhair
(74) *Attorney, Agent, or Firm* — ScienBiziP, P.C.

(57) ABSTRACT

A lighting device for applying light to an irradiation object includes a light source, an optical member, an optical sheet, and a housing member. The optical member is in a plate shape through which light from the light source enters. The optical sheet is configured to apply optical action to the light exiting from the optical member. The optical sheet includes a plate body portion and an extending portion provided on at least a first end of the body portion. The extending portion is folded in a zigzag manner and arranged in such a manner as to cover a region between the outer peripheral edge of the optical member and the housing member. The housing member is configured to surround an outer peripheral edge of the optical member and an outer peripheral edge of the optical sheet.

10 Claims, 6 Drawing Sheets

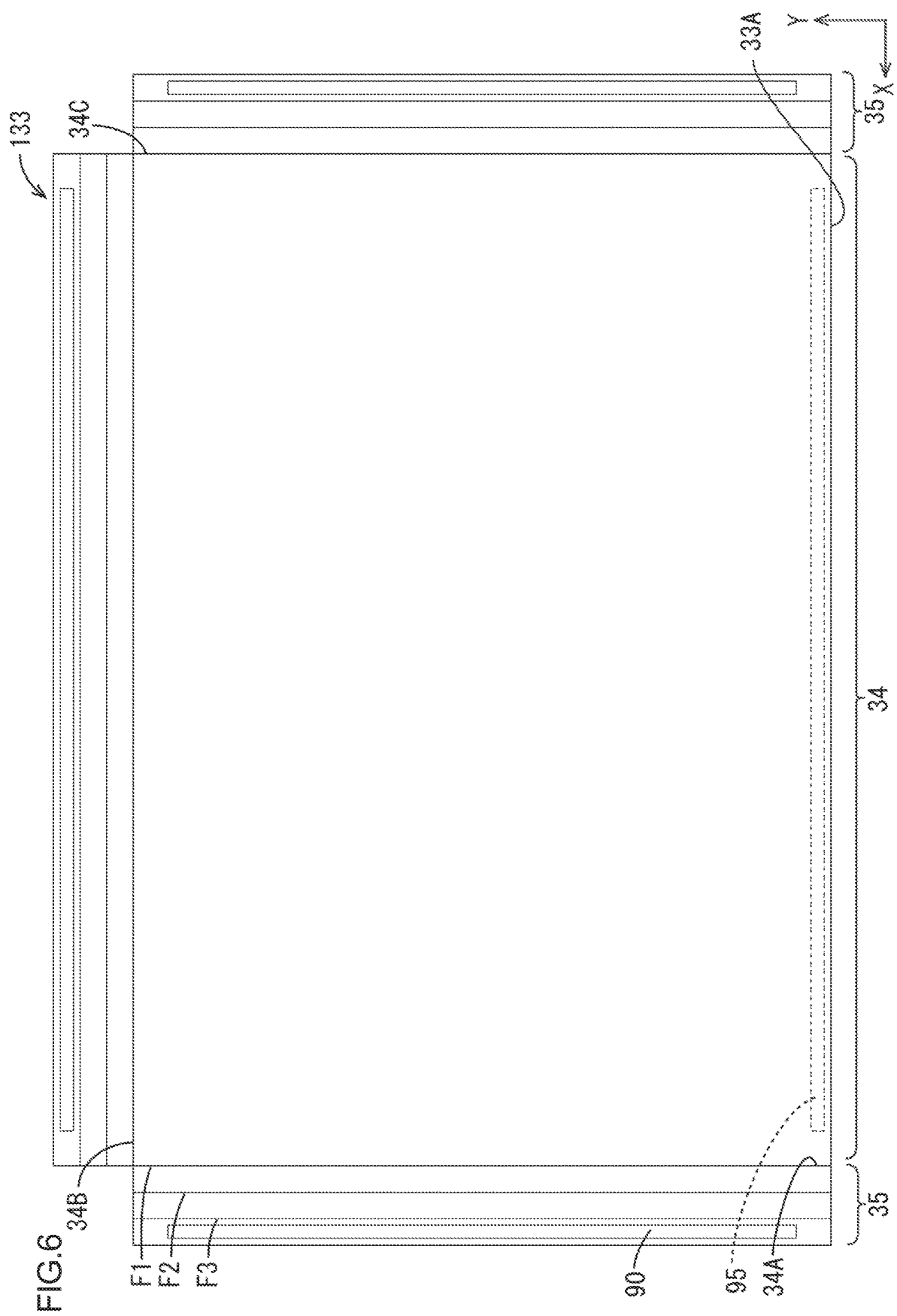

LIGHTING DEVICE AND DISPLAY DEVICE

CROSS REFERENCE TO RELATED APPLICATION

This application claims priority from U.S. Provisional Patent Application No. 62/757,073 filed on Nov. 7, 2018. The entire contents of the priority application are incorporated herein by reference.

TECHNICAL FIELD

The technology described herein relates to a lighting device and a display device.

BACKGROUND

Examples of currently-known liquid crystal display devices include one described in Japanese Application Patent Publication No. 2011-186179A. The liquid crystal display device described in the patent literature includes a light source, a light guide body (light guide plate) configured to guide light from the light source, an optical sheet configured to apply predetermined optical action to the light from the light guide plate to cause light to exit to a liquid crystal panel, and a frame in a casing shape that is configured to fix these parts. The liquid crystal display device described above possesses the feature that a first side of the optical sheet includes a folded portion, and a protrusion provided at a front end of the folded portion engages with a recess formed on a lateral portion of the light guide plate to achieve alignment of the optical sheet with the light guide plate.

Since the optical sheet expands thermally along its plate face as operation temperature rises. Accordingly, an expanded front end of the optical sheet contacts a frame and the like to bend the plate face, which results in light unevenness in the liquid crystal panel. In order to avoid such inconvenience, the currently-used liquid crystal display device ensures a predetermined gap (clearance space) between the optical sheet and the frame.

Foreign substances such as dust may enter the clearance space externally of the liquid crystal display device. The clearance space is positioned at a non-active area of the liquid crystal panel. Accordingly, the entered foreign substances normally lead to less influence on image display. However, vibration may be likely to cause the foreign substances to move from the clearance space to an active area between the optical sheet and the liquid crystal panel. In such a case, degradation in image display occurs such as a condition where foreign substances appear as black spots on the liquid crystal panel.

SUMMARY

The technology described herein was made in view of the above circumstances. An object is to suppress bending of an optical sheet and to prevent entering of foreign substances between an optical sheet and a liquid crystal panel.

An embodiment of the technology described herein includes a lighting device for applying light to an irradiation object. The lighting device includes: a light source; an optical member in a plate shape through which light from the light source enters; an optical sheet configured to apply optical action to the light exiting from the optical member; and a housing member configured to surround an outer peripheral edge of the optical member and an outer peripheral edge of the optical sheet. The optical sheet includes a plate body portion, and an extending portion provided on at least a first end of the body portion. The extending portion is folded in a zigzag manner, and is arranged in such a manner as to cover a region between the outer peripheral edge of the optical member and the housing member.

Another embodiment of the technology described herein includes a display device including the lighting device; and a display panel configured to display an image with use of light exiting from the lighting device.

The embodiments of the technology described herein achieve suppression in bending of the optical sheet and prevention of foreign substances from entering a region between the optical sheet and the liquid crystal panel.

BRIEF DESCRIPTION OF THE DRAWINGS

FIG. 6 is a plan view of an optical sheet according to the second embodiment while creases of an extending portion expand.

DETAILED DESCRIPTION

First Embodiment

Figure 1:
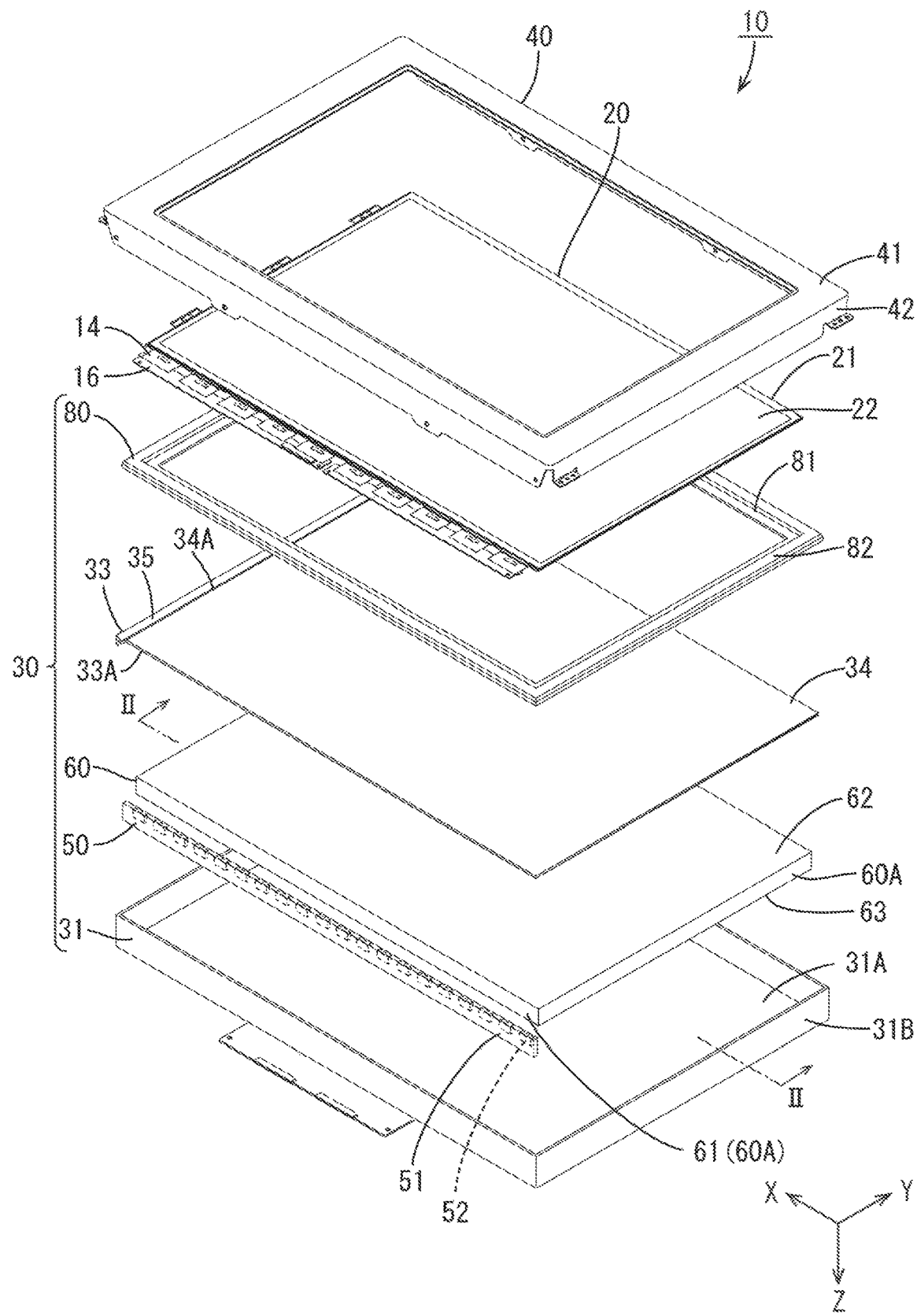
FIG. 1 is an exploded perspective view of a liquid crystal display device according to a first embodiment.

The following describes a first embodiment of the technology described herein with reference to FIGS. 1 to 4. The present embodiment exemplarily describes a liquid crystal display device (one example of a display device) 10 including a back light device 30 (one example of a lighting device) that is configured to apply light to a liquid crystal panel 20 (one example of an irradiation object). Note that each of drawings partially indicates an X-axis, a Y-axis, and a Z-axis, each of which is common to the direction where the drawing is illustrated.

As the exploded perspective view illustrated in FIG. 1, the liquid crystal display device 10 according to this embodiment includes a liquid crystal panel 20 as a display panel, and a back light device 30 configured to apply light to the liquid crystal panel 20, both of which are supported integrally by a bezel 40 and a frame 80 and the like as a supporting member in a box shape. The liquid crystal panel 20 is assembled in such a manner that a display face thereof, capable of displaying an image, faces toward a front side (outwardly). The liquid crystal panel 20 is oblong rectangular in its entirety. The liquid crystal panel 20 includes inside thereof a plate face divided into an active area 21 where an image is capable of being displayed and is arranged at a center region, and a peripheral edge 22 as a non-active area configured to surround the active area 21 in a box shape (frame shape) in plan view. A control substrate 16, such as a system LSI configured to supply image data needed for image display and various types of control signals, is connected to the liquid crystal panel 20 via a flexible substrate 14 as a flexible circuit board.

The liquid crystal panel 20 includes paired transparent glass substrates that adhere to each other by a predetermined gap, and a liquid crystal layer between the glass substrates. One of the glass substrates includes switching elements (e.g., TFTs), pixel electrodes, and an alignment film arranged thereon. The switching elements are connected to a source line and a gate line intersecting each other. The pixel electrodes are connected to the switching elements. The other of the glass substrates includes color filters, counter electrodes, and an alignment film. The color filters include coloring portions of R (red), G (green), and B (blue) provided in given arrangement.

The bezel 40 extends along a peripheral edge 22 on a front side of the liquid crystal panel 20. The bezel 40 constitutes a front appearance of the liquid crystal display device 10. The bezel 40 is made from metal or resin with excellent rigidity. The bezel 40 includes a bezel body 41 and a bezel lateral wall 42. The bezel body 41 extends in parallel to the liquid crystal panel 20 and forms a plate face in a substantially frame shape in plan view. The bezel lateral wall 42 extends rearwardly from an outer periphery edge of the bezel body 41.

Figure 2:
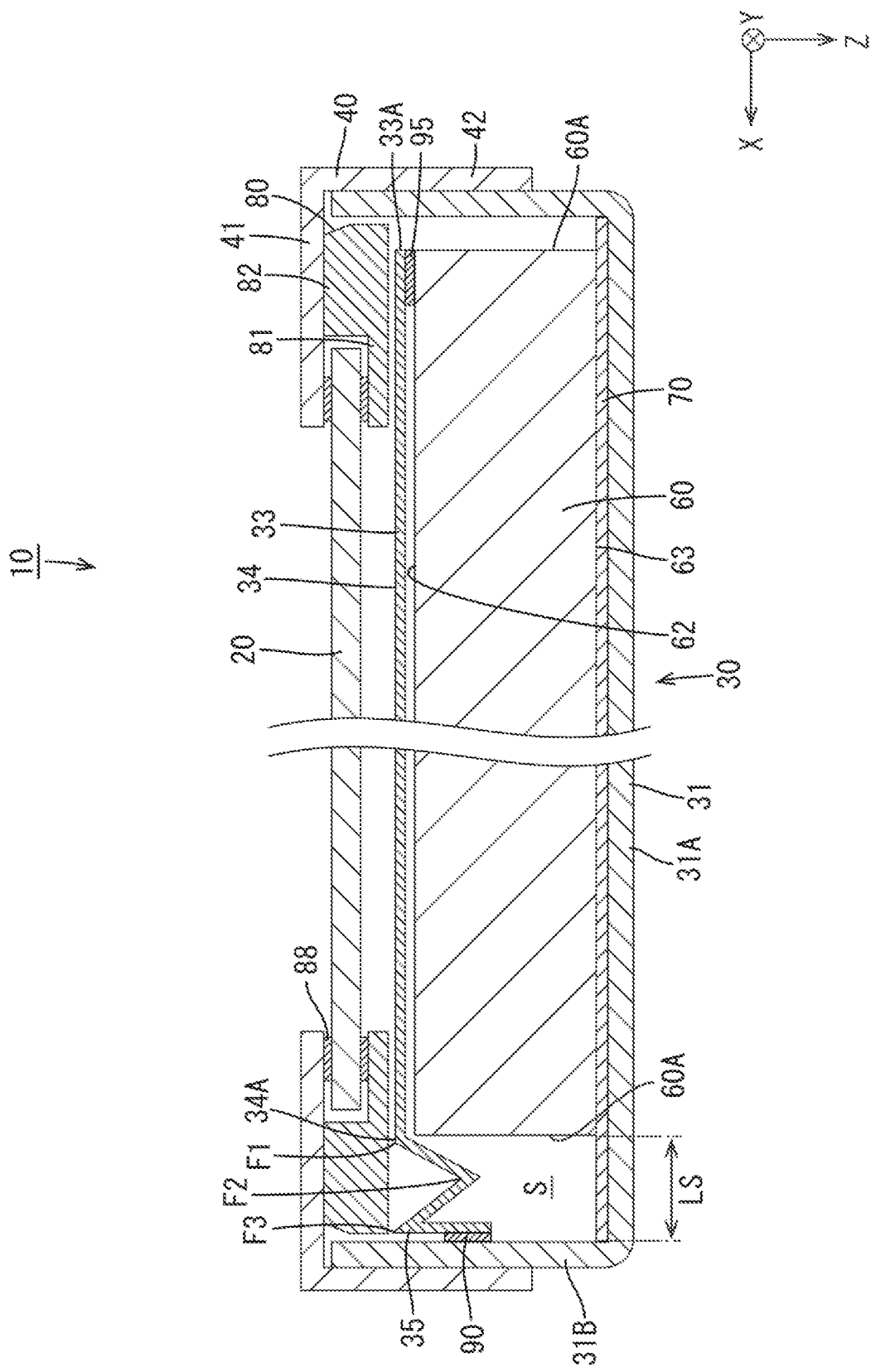
FIG. 2 is a sectional view of the liquid crystal display device according to the first embodiment along the II-II line of FIG. 1.

The frame 80 is made from metal or resin. As illustrated in FIG. 1 and FIG. 2 (i.e., a sectional view along the II-II line of FIG. 1), the frame 80 extends along the peripheral edge 22 on a rear side of the liquid crystal panel 20 to support the liquid crystal panel 20 from a rear side of the liquid crystal panel 20. The frame 80 includes a plate face portion 81 and a fixing portion 82. The plate face portion 81 is in a plate shape and in parallel to the liquid crystal panel 20. The fixing portion 82 connects the plate face portion 81 and the bezel body 41 for fixation. The plate face portion 81 and the fixing portion 82 are formed in a box shape. In other words, the liquid crystal panel 20 is sandwiched with the plate face portion 81 of the frame 80 on the rear side of the liquid crystal panel 20 and the bezel body 41 on the front side of the liquid crystal panel 20. Pads 88 are disposed between the liquid crystal panel 20 and these elements, respectively.

The following describes the configuration of the back light device 30. As illustrated in FIGS. 1 and 2, the back light device 30 includes a substantially boxed-shaped chassis 31 (one example of the housing member) that is opened toward the front side (toward a side where light exits, adjacent to the liquid crystal panel 20). In the chassis 31, an LED unit 50, a plate-shaped light guide plate 60 (one example of the optical member), an optical sheet 33, and a reflection sheet 70 are housed. The LED unit 50 includes LEDs 52 (one example of the light source). Light from the LEDs 52 enters into the light guide plate 60. The optical sheet 33 applies predetermined optical action to light exiting from the light guide plate 60. The reflection sheet 70 reflects leaked light toward the light guide plate 60.

In the chassis 31, the light guide plate 60 includes a long-side lateral faces (light incident faces) 61 arranged in such a manner as to face the LEDs 52. The light guide plate 60 guides light emitted from the LEDs 52 toward the liquid crystal panel 20. Specifically, the back light device 30 according to this embodiment adopts a so-called edge-light system (side-light system) in which the LEDs 52 are arranged laterally on the rear side of the liquid crystal panel 20. The following describes each component of the back light device 30 in detail.

The chassis 31 is made from metal such as aluminum. As illustrated in FIGS. 1 and 2, the chassis 31 is formed by a base board 31A that is oblong rectangular in a similar shape as the liquid crystal panel 20, and a lateral plate 31B erecting up from an outer periphery edge of the base board 31A. The lateral plate 31B of the chassis 31 surrounds outer peripheral end faces 60A (one example of the outer peripheral edge) of the light guide plate 60 and an outer peripheral end face 33A (one example of the outer peripheral edge) of the optical sheet 33.

The LED unit 50 is configured in such a manner that a plurality of LEDs 52 is arranged in line by equal gaps on the rectangular LED substrate 51 made from resin. As illustrated in FIG. 1, the LED substrate 51 has an elongated plate shape extending along one of long sides of the chassis 31 (X-axis direction). The LED substrate 51 faces the lateral face (light incident face) 61 on the long side of the light guide plate 60 by a predetermined clearance with respect to the light guide plate 60. The LEDs 52 are bonded on a surface of the plate face of the LED substrate 51 adjacent to the light incident face 61.

The light guide plate 60 is made from a synthetic resin material (e.g., acrylic resin such as polymethyl methacrylate (PMMA) and polycarbonate) whose index of refraction is sufficiently higher than air and which is substantially transparent. As illustrated in FIG. 1, the light guide plate 60 is an oblong rectangular plate in plan view, which is similar to the liquid crystal panel 20 and the chassis 31. In addition, the light guide plate 60 has a thickness larger than that of the optical sheet 33. The light guide plate 60 guides light, emitted from the LEDs 52 along a Y-axis direction, from the lateral face (light incident face) 61 on the long side, and moves the light upwardly toward the optical sheet 33 while causing the light to propagate inside, whereby the light exits from the front face (light exiting face) 62.

The reflection sheet 70 is a rectangular sheet. The reflection sheet 70 is made from synthetic resin and includes a front face in white color with an excellent light reflecting property. The reflection sheet 70 is disposed between a rear face 63 of the light guide plate 60 and the base board 31A of the chassis 31. The reflection sheet 70 reflects light leaked from the LEDs 52 or the rear face 63 of the light guide plate 60 toward the light guide plate 60.

The optical sheet 33 is flexible, and is disposed between the liquid crystal panel 20 and the light guide plate 60. Accordingly, the optical sheet 33 causes light from the light guide plate 60 to exit toward the liquid crystal panel 20 while applying predetermined optical action to the light. For instance, a diffusion sheet configured to diffuse light, a lens sheet configured to apply light collecting action to light, a reflective polarization sheet configured to polarize light, and a wavelength conversion sheet configured to convert light to one with another wavelength are adoptable for the optical sheet 33. Alternatively, these sheets may be laminated for use as the optical sheet 33. A base material for each of various sheets as above is made from a synthetic resin material.

Figure 3:
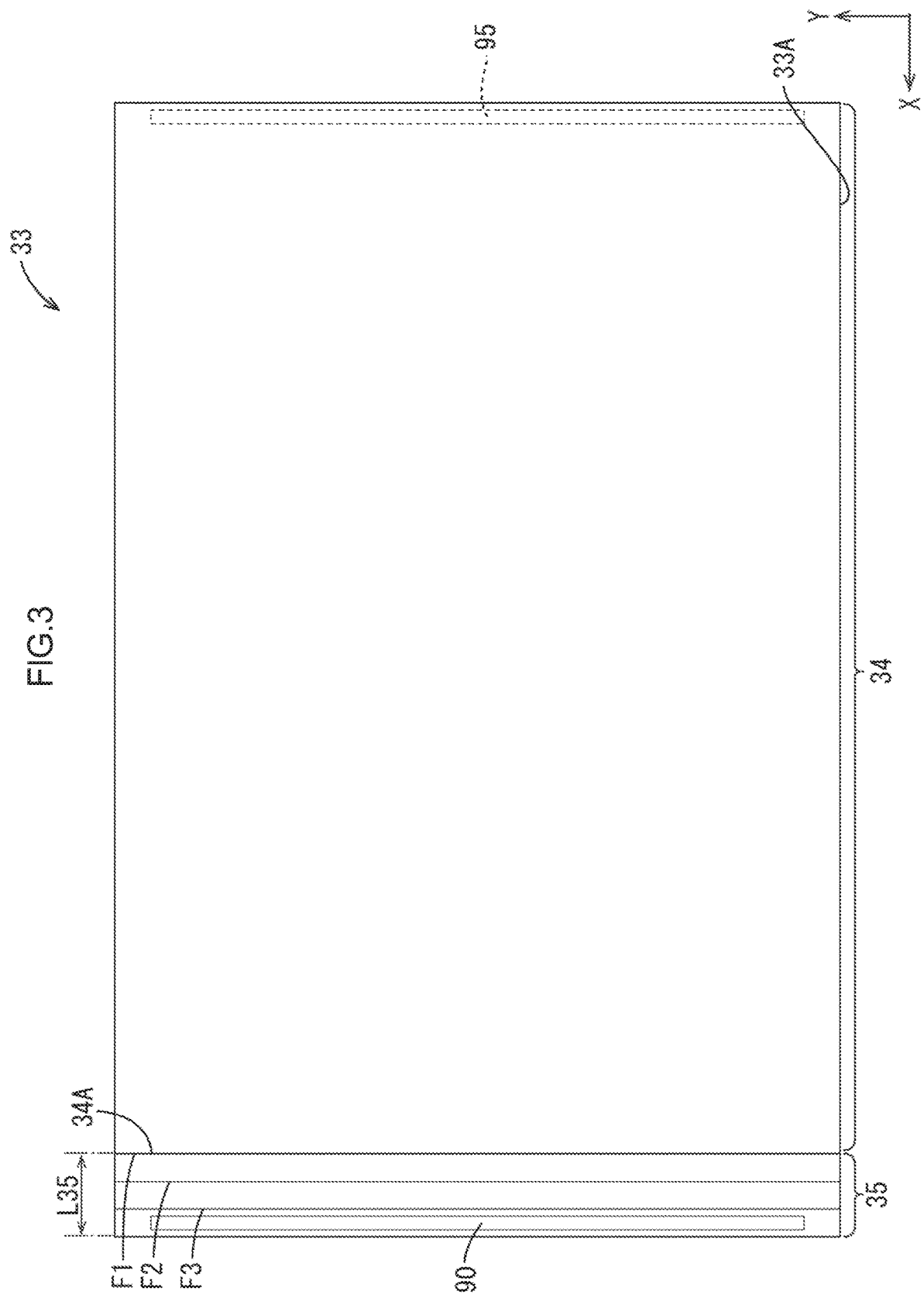
FIG. 3 is a plan view of an optical sheet while creases of an extending portion are expanded.
Figure 4:
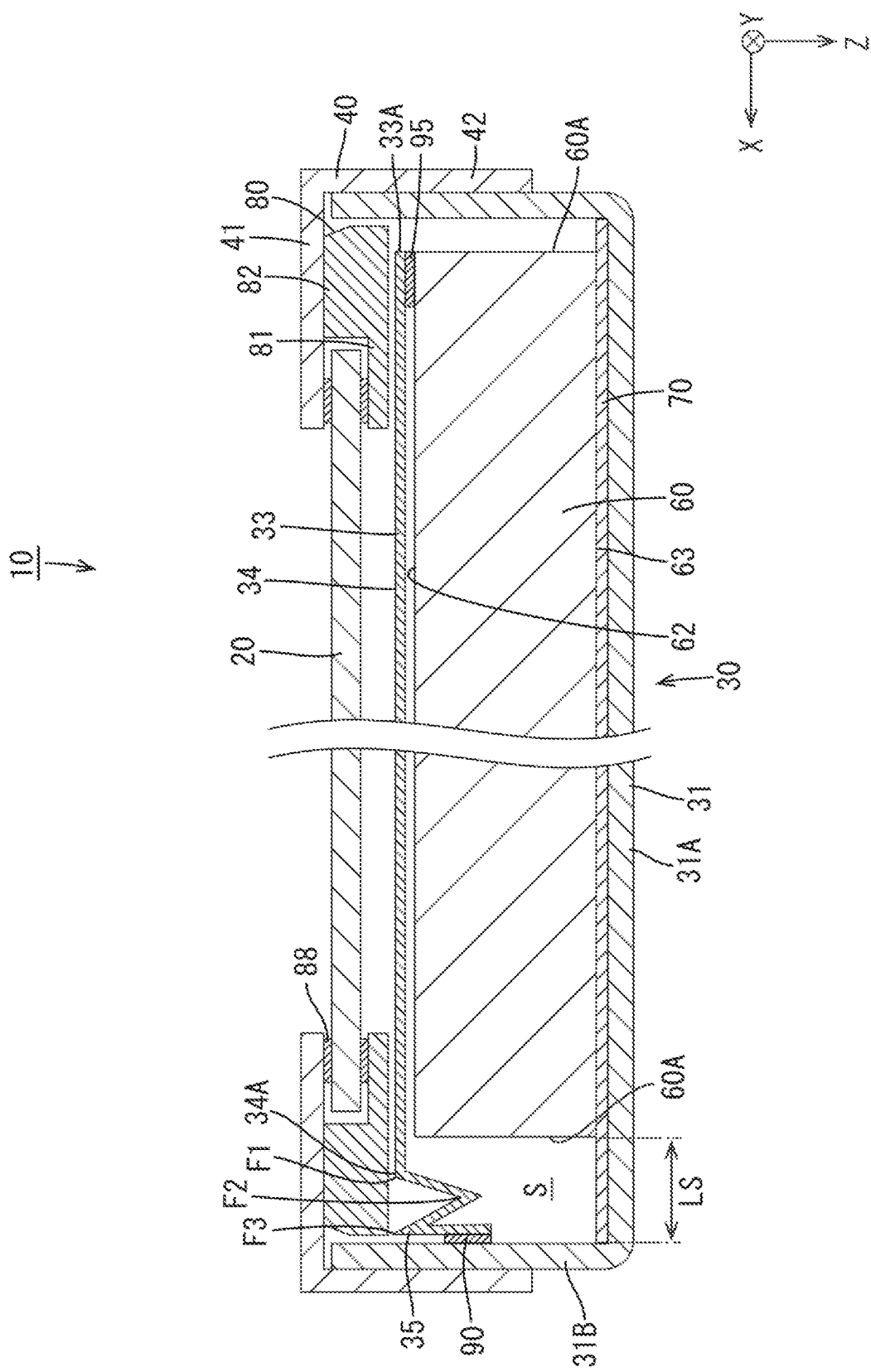
FIG. 4 corresponds to the illustration of FIG. 2 in usage of high temperatures.

As illustrated in FIGS. 1, 2, and 3 (i.e., a plan view in which the creases of the extending portion are expanded), the optical sheet 33 includes a plate body portion 34, and an extending portion 35 provided on one side portion 34A of four side portions of the body portion 34. The body portion 34 has an oblong rectangular shape in plan view, which is similar to the light guide plate 60. The body portion 34 has a dimension at least overlapping the light exiting face 62 of the light guide plate 60 entirely. As illustrated in FIG. 2, the extending portion 35 is disposed in such a manner as to cover a region (clearance space S) between the outer peripheral end face 60A of the light guide plate 60 and the lateral plate 31B of the chassis 31. The extending portion 35 has a length L35 larger than a length LS of the clearance space S. With such arrangement of the extending portion 35, even if any foreign substances such as dust enter the clearance space S externally for some reason, the foreign substances are preventable from moving toward the front side of the optical sheet 33 since the extending portion 35 covers the clearance space S. Moreover, when a front end of the extending portion 35 is fixed on the lateral plate 31B of the chassis 31 with an adhesive tape 90, the extending portion 35 is capable of covering the clearance space S certainly. Here in this embodiment, an alignment adhesive tape 95 configured to align the optical sheet 33 with the light guide plate 60 adheres to side portions of the body portion 34 other than the side portion 34A where the extending portion 35 is formed (side portions opposite to the side portion 34A in this embodiment).

It is preferred that the extending portion 35 is disposed in such a manner as to cover the outer peripheral end face 60A of the four outer peripheral end faces 60A of the light guide plate 60, other than the light incident face 61 where light from the LEDs 52 enters, and the lateral plate 31B of the chassis 31. When the extending portion 35 is arranged in such a manner as to cover the clearance space S adjacent to the light incident face 61, incident light from the LEDs 52 to the light guide plate 60 is blocked partially by the extending portion 35. Accordingly, the extending portion 35 is disposed on the outer peripheral end face 60A other than the light incident face 61, thereby preventing decrease in incidence rate of light from the LEDs 52 to the light guide plate 60.

As illustrated in FIG. 3, the one side portion 34A of the body portion 34 extends in the X-axis direction (extending direction), whereby the extending portion 35 is formed integrally with the body portion 34. Then, creases F1, F2, F3 are put in an extended area of the body portion 34 along the Y-axis (a direction perpendicular to the extending direction). Consequently, the extending portion 35 is folded in a zigzag manner (in an accordion manner). The optical sheet 33 expands thermally to extend in a plate face direction as operation temperature becomes higher. In this case, as illustrated in the sectional view of FIG. 4, the extending portion 35 is formed in an accordion manner, and thus contacts against the lateral plate 31B of the chassis 31 to retract. Since the extending portion 35 retracts, suppressed bending of the body portion 34 of the optical sheet 33 is obtainable under thermal expansion, resulting in a maintained planar condition thereof.

As illustrated in FIG. 2, the extending portion 35 includes a first crease F1, a second crease F2, and a third crease F3 put therein in this order in the extending direction. The first crease F1 is formed in a peak shape (i.e., protrudes toward the front side of the optical sheet 33). The second crease F2 is formed in a valley shape (i.e., protrudes toward the rear side of the optical sheet 33). The third crease F3 is formed in a peak shape. The crease in a valley shape and the crease in a peak shape alternately formed achieve retraction. Accordingly, the first crease F1 in a valley shape, the second crease F2 in a peak shape, and the third crease F3 in a valley shape may be successively formed. Moreover, an interval between the adjacent creases is not necessarily equal. Moreover, it is preferable that a plurality of creases is put in the extending portion 35 (i.e., the first and the second creases F1, F2 are formed), and the number thereof is not limitative as long as the number is two or more. The creases achieve easy retraction of the extending portion 35 in the extending direction (X-axis direction). As illustrated in FIG. 3 in this embodiment, the first crease F1 is formed on a boundary between the extending portion 35 and the body portion 34. With such a configuration, the creases are easily formable even when the liquid crystal display device 10 is a narrow frame and the length L35 of the extending portion 35 is small. In addition, a groove or perforations pre-formed on the crease become a mark for the crease and also facilitate formation of the crease.

According to the embodiment of the technology described herein described above, the back light device 30 is configured to apply light to the liquid crystal panel 20. The back light device 30 includes the LEDs 52, the light guide plate 60 in a plate shape through which light from the LEDs 52 enters, the optical sheet 33 configured to apply optical action to the light exiting from the light guide plate 60, and the chassis 31 configured to surround the outer peripheral end face 60A of the light guide plate 60 and the outer peripheral end face 33A of the optical sheet. The optical sheet 33 includes the plate body portion 34, and the extending portion 35 disposed on at least the first end 34A of the body portion 34. The extending portion 35 is folded in a zigzag manner, and is configured to cover a region between the outer peripheral end face 60A of the light guide plate 60 and the chassis 31.

With such a configuration, even if any foreign substances such as dust enter the clearance space S externally, movement of the foreign substances toward the front side of the optical sheet 33 is suppressed since the extending portion 35 covers the clearance space S. This prevents degraded image display resulting from the foreign substances entering between the optical sheet 33 and the liquid crystal panel 20 and moving within the active area 21 of the liquid crystal panel 20 to appear as black pots in the active area 21. Moreover, the optical sheet 33 expands thermally to extend in a plate face direction as operation temperature becomes higher. In this case, the extending portion 35 is folded in a zigzag manner (accordion manner), and thus contacts against the lateral plate 31B of the chassis 31 in thermal expansion to retract. Since the extending portion 35 retracts, suppressed bending of the body portion 34 of the optical sheet 33 is obtainable under thermal expansion, resulting in a maintained planar condition thereof.

Second Embodiment

Figure 5:
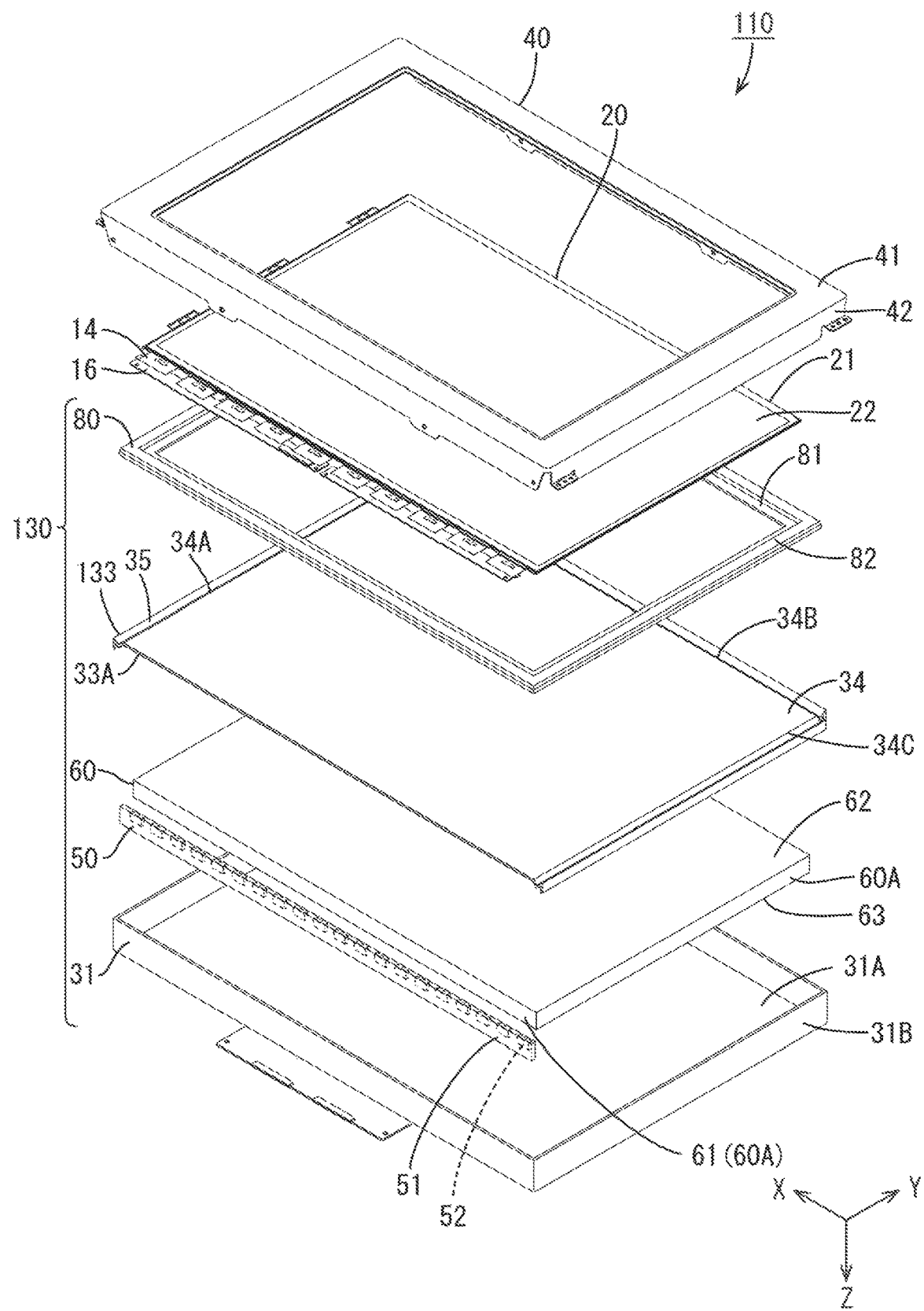
FIG. 5 is an exploded perspective view of a liquid crystal display device according to a second embodiment.

The following describes a second embodiment of the technology described herein with reference to FIGS. 5 and 6. In the second embodiment, the number of extending portions 35 arranged in an optical sheet 133 is larger than that in the first embodiment described above. Here, the description of the configuration and operational advantage common to that of the first embodiment is to be omitted.

As illustrated in FIGS. 5 and 6, a liquid crystal display device 110 according to this embodiment includes the optical sheet 133 provided in a back light device 130. The optical sheet 133 includes a plate body portion 34, which is similar to that of the first embodiment described above, and includes extending portions 35 provided on three side portions 34A, 34B, 34C of four side portions of the body portion 34, which differs from the extending portion 35 of the first embodiment. As illustrated in FIG. 5, the extending portions 35 are disposed in such a manner as to cover three of clearance spaces S, except for one adjacent to the light incident face 61, individually between the outer peripheral end face 60A of the light guide plate 60 and the lateral plate 31B of the chassis 31. With such a configuration where the extending portions 35 cover the three clearance spaces S, degraded image display is effectively suppressible, the degraded image being resulting from the foreign substances entering between the optical sheet 33 and the liquid crystal panel 20 and moving within the active area 21 of the liquid crystal panel 20.

Other Embodiments

The technology described herein is not limited to the embodiments described above with the description and the drawings. Such embodiments as under are contained in the technical scope of the technology described herein.

(1) In the embodiments described above, an example of the edge light type back light device has been described as the back light device in which LEDs are arranged laterally on the rear side of the liquid crystal panel. Alternatively, a so-called direct back light device in which LEDs are arranged over the rear side of the liquid crystal panel to face over the rear side of the liquid crystal panel is adoptable. In such a case, an LED unit including the LEDs is disposed on a base board of a chassis, and a diffusion plate is used as a plate optical member where light from the LEDs enter. The optical sheet applies optical action to light exiting from the diffusion plate.

(2) In the embodiments described above, such an example has been described that the first end of the optical sheet is fixed and aligned with the light guide plate by the adhesive tape. Alternatively, a device for alignment is not limited to this. For instance, such a configuration is adoptable that engaging portions (holes, protrusions) are formed on the first end of the optical sheet to engage with an engaged portion of the light guide plate or the frame.

(3) In the embodiments described above, the liquid crystal panel, the light guide plate, the body portion of the optical sheet each have a rectangular shape. Alternatively, another shape is adoptable.

The invention claimed is:

1. A lighting device for applying light to an irradiation object, the lighting device comprising: a light source; an optical member in a plate shape through a lateral face thereof light from the light source enters; an optical sheet configured to apply optical action to the light exiting from a front face of the optical member; and a housing member configured to surround an outer peripheral edge of the optical member and an outer peripheral edge of the optical sheet and including a side wall having a surface that is opposite the optical member, the optical sheet including: a plate body portion, and an extending portion provided on at least a first end of the body portion, the extending portion being folded in a zigzag manner arranged in a space between the outer peripheral edge of the optical sheet and the side wall of the housing member, and an outer edge portion of the extending portion being bonded via an adhesive tape to the surface of the side wall that is opposite the optical member.

2. The lighting device according to claim 1, wherein the extending portion of the optical sheet is disposed at a region of the outer peripheral edge of the optical member, the region being different from a light incident face where the light from the light source enters.

3. The lighting device according to claim 2, wherein
the optical member is a light guide plate configured to guide the light from the light source, and
the light source is arranged in such a manner as to face the light incident face of the light guide plate.

4. The lighting device according to claim 1, wherein
the extending portion of the optical sheet is formed integrally with the body portion in such a manner as to extend in a predetermined direction, and
the extending portion includes a crease perpendicular to an extending direction of the extending portion.

5. The lighting device according to claim 4, wherein a plurality of the creases is formed in such a manner as to be spaced apart from one another in the extending direction.

6. The lighting device according to claim 1, wherein
the body portion of the optical sheet is rectangular, and
the extending portion of the optical sheet is formed on three side portions of the body portion.

7. A display device, comprising:
the lighting device according to claim 1; and
a display panel configured to display an image with use of light exiting from the lighting device.

8. The lighting device according to claim 1, wherein
the optical sheet is disposed between the optical member and the irradiation object, and
the plate body portion has a plate surface that overlaps an entire area of a light exiting surface of the optical member.

9. The lighting device according to claim 1, wherein the extending portion extends from the first end of the body portion by an extending length, and the extending length is larger than a length of the region ranging from the outer peripheral edge of the optical member to the housing member.

10. The lighting device according to claim 1, wherein the extending portion extends along an entire length of the first end of the body portion.

\* \* \* \* \*